United States Patent

[11] 3,617,227

| [72] | Inventor | Donald Beggs<br>Toledo, Ohio |
|---|---|---|
| [21] | Appl. No. | 821,582 |
| [22] | Filed | May 5, 1969 |
| [45] | Patented | Nov. 2, 1971 |
| [73] | Assignee | Midland-Ross Corporation<br>Toledo, Ohio |

[54] APPARATUS FOR CATALYTIC REFORMING
2 Claims, 1 Drawing Fig.

[52] U.S. Cl. ............................................. 23/288 M,
23/212 R, 23/227 R, 48/196, 48/213, 48/214,
252/373
[51] Int. Cl. ..................................................... B01j 9/04,
C01b 2/16
[50] Field of Search........................................... 48/196,
213, 214, 75, 93, 94, 105; 23/288.92, 277, 212,
212 A, 212 B; 252/373

[56] References Cited
UNITED STATES PATENTS

| 2,668,101 | 2/1954 | Arnold et al. | 48/196 |
| 2,709,128 | 5/1955 | Krause | 23/288 M |
| 2,828,196 | 3/1958 | Glover et al. | 48/214 |
| 3,034,869 | 5/1962 | Peterson | 23/288 M |
| 3,119,667 | 1/1964 | McMahon | 23/212 A |
| 3,132,010 | 5/1964 | Dwyer et al. | 48/196 X |
| 3,164,272 | 1/1965 | Oliver | 23/288 M X |
| 3,223,490 | 12/1965 | Sacken et al. | 23/288 M |
| 3,385,670 | 5/1968 | Van Hook et al. | 23/212 |
| 3,431,082 | 3/1969 | Sellin | 23/288 M |
| 3,467,504 | 9/1969 | Korwin | 48/196 X |

Primary Examiner—Joseph Scovronek
Attorneys—Peter Vrahotes and Harold F. Mensing ABSTRACT: This disclosure relates to an apparatus for the catalytic reforming of gaseous hydrocarbon that may use steam and/or carbon dioxide as the reforming oxidant. The reforming is accomplished by passing the hydrocarbon and oxidant through a tube which is substantially uniformly heated its entire length and contains refractory preheater particles adjacent the inlet opening and catalytic particles intermediate the preheater particles and the tube outlet. Stoichiometric reforming is achieved without carbon deposition and degradation of the catalyst by employing preheater refractory and catalytic lump particles that are large relative to the size of the tube diameter and the particles have a bulk density of approximately 100 pounds per cubic foot.

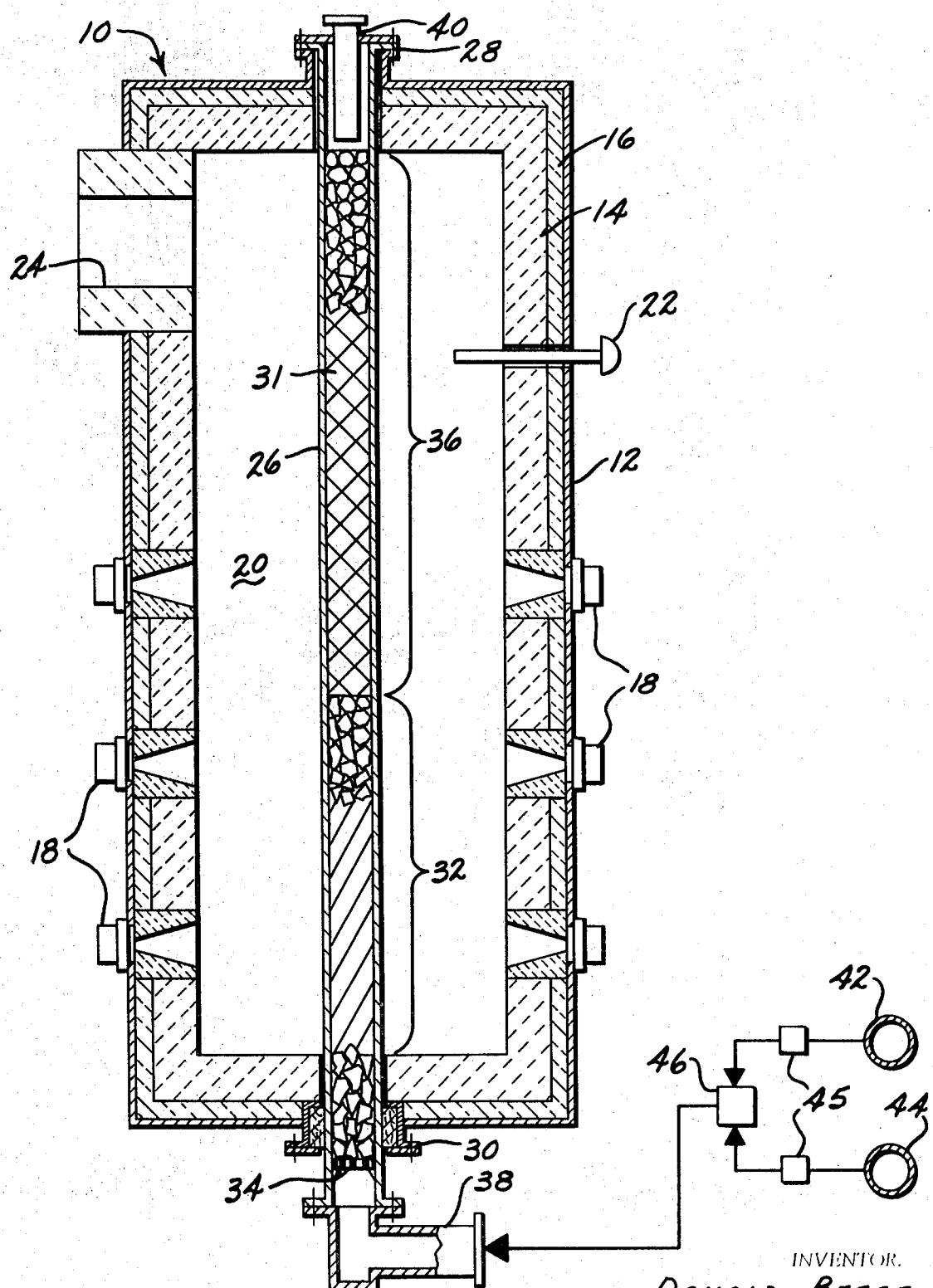

APPARATUS FOR CATALYTIC REFORMING

DISCUSSION

In the field of endothermic catalytic reforming of gaseous hydrocarbons, such as methane, natural gas, propane, or naphtha vapor, to produce a reformed gas containing CO and $H_2$, steam is the reforming oxidant most commonly employed, and $CO_2$, or mixtures of steam and $CO_2$, are sometimes employed. The well-known reforming reactions, based on methane, are:

$$CH_4 + H_2O \longrightarrow CO + 3H_2$$

$$CH_4 + CO_2 \longrightarrow 2CO + 2H_2$$

The catalyst used for such reforming is conventionally a packed bed of nominal ½-inch to nominal 1-inch highly porous lump containing nickel, and such catalyst in addition to catalyzing the reforming reaction also tends to catalyze the following carbon depositing reactions:

$$CH_4 \longrightarrow C + 2H_2 \text{ and also } 2CO \longrightarrow C + CO_2$$

In reforming with steam and/or $CO_2$ as the reforming oxidant, it is common practice to utilize an amount of steam and/or $CO_2$ considerably in excess of the stoichiometric amount in order to avoid carbon deposition in the catalyst. Carbon deposition in the catalyst pores will physically degrade the lump into fines which will block gas flow through the catalyst bed and make the reforming commercially impractical. Reforming with a considerable excess of steam and/or $CO_2$ produces a reformed gas containing substantial amounts of both $H_2O$ vapor and $CO_2$, which for many applications are undesirable oxidizing constituents.

I have discovered an apparatus for catalytic reforming that enables stoichiometric reforming to be successfully achieved, using steam and/or $CO_2$ as reforming oxidants, without encountering carbon deposition of degradation of the catalyst.

This apparatus is shown in the drawing, having a single FIG., wherein an elevational, cross sectional view of a reforming furnace is shown that utilizes the principles of the instant invention.

Referring now to the drawing, a reformer furnace is shown generally at 10 having an outer steel casing 12 lined with insulating firebrick 14 backed up with block insulation 16 to form a furnace wall suitable for operation in the temperature range of 2,000° to 2,200° F. The furnace walls are equipped with a plurality of fuel fired burners 18 which fire into a combustion chamber 20 defined by the firebrick 14. The burners 18 are responsive through means (not shown) to a furnace temperature control thermocouple 22 for controlling the furnace temperature as required. A flue opening 24 is provided to vent the spent combustion gases from the combustion chamber 20.

Positioned within the combustion chamber 20 is a vertically disposed catalyst tube 26 made of heat resisting alloy. The tube 26 is supported at its upper end by a suitable flanged connection 28 and arranged to expand at its lower end through a packing gland assembly 30.

Received within the tube 26 is a catalyst bed 31 comprising a plurality of discrete particles. The lower region of the tube 26 is filled with preheater lump particles 32. The preheater lump 32 is supported on a screen 34 removably fastened to the lower end of the tube 26.

The upper region of tube 26 is filled with catalyst lump particles 36. A gas pipe 38 is connected to the lower end of the tube 26 to admit the gas mixture to be reformed. A gas offtake pipe 40 is fastened to the upper end of the tube 26.

Gaseous hydrocarbon from a source 42 and reforming oxidant from a source 44 are suitably metered and ratioed by meters 45 and fed to a mixer 46 which is connected to the mixture inlet 38.

In operation, a hydrocarbon gas such as methane, propane, or naphtha vapor is supplied from the hydrocarbon source 42 to the mixer 46. An oxidant such as steam or $CO_2$ is supplied in substantially stoichiometric proportion, by adjustment of the meters 45, from source 44 to the mixer 46 wherein the hydrocarbon and oxidant are mixed. The gases are then fed from tube 38 into the catalyst tube 26. The burners 18 fire into the combustion chamber 20, thereby raising the temperature of the catalyst tube 26 within the range of 1,800° to 2,200° F. As the catalyst tube 26 is heated, the catalyst lump 36 and preheater lump 32 are heated indirectly by radiation and conduction. As used throughout this specification and appended claims, the term catalytic is defined as having the ability to accelerate a reforming reaction between a hydrocarbon and an oxidant. The gases passing through the tube first contact the preheater lump 32 wherein the gas is raised to the reacting temperature. After the gases are at the proper temperature, they then contact the catalyst lump 36 wherein the hydrocarbon and oxidant react with one another to form reductants such as CO and $H_2$. The gases then pass through the offtake pipe 40 to be used as desired.

It has been found that unexpected results are achieved if the lump of the catalyst bed 31 are of a large size. For example, it has been found that if the catalyst lump 36 is at least 20 percent the size of the diameter of the tube 26, a highly efficient reaction has taken place. More particularly, the hydrocarbon may be reformed with steam or $CO_2$ in substantially stoichiometric proportions, whereas in prior reforming operations it was necessary to have a considerable excess amount of steam or $CO_2$ in order to avoid degradation of the catalyst lump 36. By degradation, it is meant that the catalytic lump would be destroyed by carbon which is deposited in the pores during the reaction if sufficient excess steam or $CO_2$ is not used. Although the reasons are not known exactly why the large lump prevents degradation at substantially stoichiometric proportions, it is believed that having the large lump results in a more uniform temperature distribution within the tube 26. By having the lump 36 large, the individual particles are exposed directly to radiation emitted from the tube 26 and are thereby able to benefit directly from the source of heat. In addition, the lump of this particular invention has a high density, thereby providing high thermal conductivity which, of course, results in greater distribution of heat throughout the bed 31. Still another feature of this catalytic bed 31 is that the surface of the lumps 32 and 36 is very irregular, thereby breaking up the streams of gas as they pass through the tube 26 so that the streams are more effectively distributed throughout the tube. Although the catalyst tube 26 shown and described has a tubular configuration, it will be appreciated that other configurations may be used equally well.

In one example of a reforming furnace 10 which was constructed in accordance with the principles of the instant discovery, the tube 26 employed had an 8 inch inside diameter with a half-inch wall thickness and an overall length to provide 20 feet of effective heated length within the furnace.

The preheater lump 32 in the lower region of catalyst tube 26 is employed to preheat the mixture to reforming temperature prior to the mixture contacting the catalyst lump. The preheater lump used may be an aluminum oxide refractory material which has a 98 percent to 99 percent purity aluminum oxide that has been prepared by melting aluminum oxide in an electric arc furnace, cooling, solidifying, and then crushing into irregular shaped lumps. An example of such an aluminum oxide refractory material is Alundum. The lump size used was screened −3 inches and +2 inches for a nominal 2-inch to 3-inch lump size. The refractory aluminum oxide used is a very hard and relatively heavy refractory material having some porosity and is a good conductor of heat. The bulk density of the nominal 2-inch to 3-inch lump is approximately 100 pounds per cubic foot, which is approximately twice the bulk density of conventional reforming catalyst.

Catalyst lump 36 in the upper region of catalyst tube 26 was the same nominal 2-inch to 3-inch Alundum lump as the preheater lump, but which had been impregnated with nickel. The impregnation procedure used was as follows:

1. Mix one part by weight of water with six parts by weight of nickel nitrate salt. The chemical formula of the salt is $Ni(NO_3)_2 6H_2O$.

2. Heat the water and salt mixture to approximately 150° F., at which temperature the nickel nitrate solution is very fluid, like water.

3. Submerge the Alundum lump in the hot solution for 5 to 10 minutes and then remove.

4. Dry the lump at 350° F. for 1 hour to remove free and combined water.

5. Roast the lump at 750° F. for 1 hour to convert the nickel nitrate to nickel oxide.

6. Repeat steps 3, 4, and 5.

The above impregnation procedure results in a nickel penetration throughout the Alundum lump, as observed by eye when a lump is fractured. Reforming tests were conducted in the reformer furnace 10, utilizing a bed of the preheater lump 32 extending to a height of 8 feet above the inside floor of the reformer furnace, and a 12-foot-high bed of the catalyst lump 36 on top of the bed of preheater lump. Consequently, 40 percent of the effective heated length of the tube 26 contained preheater lump and the balance contained catalyst lump 36. During all tests described hereinafter, the catalyst tube 26 within the reformer furnace was maintained at a temperature of approximately 1,850° F. near the bottom to a temperature of approximately 1,950° F. near the top.

Tests were conducted reforming 1,000 B.t.u. natural gas with $CO_2$ which was obtained from $CO_2$ liquid storage tanks equipped with vaporizers. The following are representative gas flows to the catalyst tube and gas analysis by volume of the reformed gas on a wet basis:

| | |
|---|---|
| Natural gas flow | 1,550 scfh |
| $CO_2$ flow | 1,600 scfh |
| Analysis of reformed gas: | |
| CO | 51.4% |
| $H_2$ | 47.1% |
| $CO_2$ | 0.3% |
| $H_2O$ | 0.3% |
| $CH_4$ | 0.2% |
| $N_2$ (by difference) | 0.7% |

Next, reforming tests were conducted utilizing $CO_2$ plus some water vapor in a process using off gas as the reforming oxidant. The representative volume analysis, on a wet basis, of the off gas utilized is as follows:

| | |
|---|---|
| $CO_2$ | 26.9% |
| $H_2O$ | 1.8% |
| CO | 29.7% |
| $H_2$ | 39.5% |
| $CH_4$ | 0.8% |
| $N_2$ (by difference) | 1.3% |

The following are representative gas flows to the catalyst tube and gas analysis by volume of the reformed gas on a wet basis:

| | |
|---|---|
| Natural gas flow | 1515 scfh |
| Off-gas flow | 4330 scfh |
| Analysis of reformed gas: | |
| CO | 45.1% |
| $H_2$ | 47.5% |
| $CO_2$ | 2.0% |
| $H_2O$ | 2.6% |
| $CH_4$ | 0.8% |
| $N_2$ (by difference) | 2.0% |

Finally, tests were conducted reforming 1,000 B.t.u. natural gas with steam. The following are representative gas flows to the catalyst tube and gas analysis by volume of the reformed gas on a wet basis:

| | |
|---|---|
| Natural gas flow | 1250 scfh |
| Steam flow | 1300 scfh |
| Analysis of reformed gas: | |
| CO | 23.4% |
| $H_2$ | 72.3% |
| $CO_2$ | 1.1% |
| $H_2O$ | 1.2% |
| $CH_4$ | 1.0% |
| $N_2$ (by difference) | 1.0% |

In each of the above tests, the reformer was operated for a number of days under the indicated conditions with no signs of gas flow restriction occurring in the catalyst tube. After each run the furnace was shut down, cooled, and the preheater lump and catalyst lump were then removed from the catalyst tube and inspected. The catalyst lump showed no signs of carbon deposition or physical degradation.

The above gas flow rates, when reforming with either $CO_2$ or steam, are in a very practical range for good economics in commercial application. It will be understood that, although the invention has been described with reference to a single catalyst tube in the reformer furnace, the invention is applicable to a plurality of such catalyst tubes within a reformer furnace.

It is understood that this description is for purposes of illustration only, and that various embodiments may be made therein without departing from the scope of the invention as set forth in the following claims.

I claim:

1. A reformer furnace comprising: wall means, a generally cylindrical tube disposed within said wall means and having a gas inlet and a gas outlet, means for heating said tube to a temperature between 1,800° F. and 2,200° F., said tube containing a group of preheater refractory particles adjacent the gas inlet, a group of catalytic particles located within the tube intermediate said first group of particles and said gas outlet, said preheater refractory particles and said catalytic particles having a bulk density of approximately 100 pounds per cubic foot with said particles having a minimum dimension which is at least 20 percent the diameter of said tube, and means for feeding a mixture of hydrocarbon and oxidant to said gas inlet.

2. The furnace of claim 1 wherein said preheater lump particles occupy a length equal to approximately 40 percent of the effective heated length of said tube.

* * * * *